US007314365B2

(12) United States Patent
Inoue

(10) Patent No.: US 7,314,365 B2
(45) Date of Patent: Jan. 1, 2008

(54) SURFACE TREATING APPARATUS AND IMAGE RECORDING APPARATUS

(75) Inventor: Hiroshi Inoue, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 347 days.

(21) Appl. No.: 10/946,318

(22) Filed: Sep. 22, 2004

(65) Prior Publication Data

US 2005/0061421 A1 Mar. 24, 2005

(30) Foreign Application Priority Data

Sep. 24, 2003 (JP) ............................ 2003-332102

(51) Int. Cl.
*B29C 41/28* (2006.01)
*B29C 41/46* (2006.01)

(52) U.S. Cl. .................. 425/324.1; 425/328; 425/365; 425/385

(58) Field of Classification Search ................ 425/115, 425/143, 121–122, 150, 230, 352–355, 364 R, 425/407, 327, 324.1, 328, 385, 363–375; 156/230

See application file for complete search history.

(56) References Cited

U.S. PATENT DOCUMENTS 4,601,861 A * 7/1986 Pricone et al. .............. 425/385
5,181,981 A * 1/1993 Godwin ...................... 264/284
5,330,799 A * 7/1994 Sandor et al. .............. 118/212
5,643,400 A * 7/1997 Bernard et al. ............. 425/115
5,743,981 A * 4/1998 Lu ............................ 156/182
6,074,192 A * 6/2000 Mikkelsen .................. 425/363
6,358,442 B1 * 3/2002 Delaney et al. ............ 264/1.31
7,070,406 B2 * 7/2006 Jeans ......................... 425/327

FOREIGN PATENT DOCUMENTS

JP 10-236086 9/1998

* cited by examiner

*Primary Examiner*—Yogendra N. Gupta
*Assistant Examiner*—Thu Khanh T. Nguyen
(74) *Attorney, Agent, or Firm*—Whitham Curtis Christofferson & Cook, PC

(57) ABSTRACT

A surface treating apparatus includes: a sheet which includes; a base, and a thermoplastic resin layer disposed on the base; a contact member configured to convey the sheet while carrying out a surface treatment of the sheet; a surface property forming unit configured to form a certain surface property on a surface of the contact member by using a surface property forming material; and a sheet heating unit configured to heat the sheet contacting the contact member, to thereby transfer the surface property of the contact member to the sheet.

21 Claims, 4 Drawing Sheets

SURFACE TREATING APPARATUS AND IMAGE RECORDING APPARATUS

BACKGROUND OF THE INVENTION

1. Field of the Invention

The present invention relates to a surface treating apparatus and an image recording apparatus provided with the surface treating apparatus which apparatuses can easily and effectively give, by using a simple unit, a desired surface property to various sheet bodies.

2. Description of the Related Art

Conventionally, various processes were carried out using processes such as silver halide photography, heat developing process, ink-jet recording process, heat sensitive recording process, electrophotography, and the like. Such technologies are, however, not known to have a simple unit for effectively controlling a surface property of a sheet obtained by the above various recording processes. For example, Japanese Patent Application Laid-Open (JP-A) No. 10-236086 discloses the following image forming process. An image which is written in an intermediate recording medium based on image information is accumulated on an image forming body, followed by a heating-pressing, to thereby form an image on the image forming body. In the above process according to the JP-A No. 10-236086, a heating-melting transfer ink layer containing a heat-foaming material is used for carrying out a heating-melting transfer recording, followed by the above heating-pressing for transferring or adhering. In the transferring or the adhering, the above conventional technology proposes to use foaming for embossing the image of the heating-melting transfer ink layer containing the heat-foaming material.

The proposal of the JP-A No. 10-236086 transferring the image to the intermediate recording medium needs cleaning of the intermediate recording medium after the transferring. Moreover, adhering the image for every transferring by the heating and pressing thickens an image recording body, thus losing an intrinsic feeling of the image recording body, which is problematical.

With the above background, such a surface treating apparatus is yet to be obtained as can easily and effectively give, by using a simple unit, a desired surface property to various sheet bodies. Providing of the above surface treating apparatus is desired.

SUMMARY OF THE INVENTION

It is therefore an object of the present invention to provide a surface treating apparatus and an image recording apparatus provided with the surface treating apparatus which apparatuses can easily and effectively give, by using a simple unit, a desired surface property to a sheet, the sheet being at least one selected from the group consisting of an ink-jet sheet, a heat sensitive recording sheet, a heat developing sheet, an electrophotographic sheet, and a silver halide photographic sheet and the desired surface property including gloss, mat, semimat, emboss, luster and the like.

Under the present invention, a surface treating apparatus comprises: a sheet which comprises; a base, and a thermoplastic resin layer disposed on the base; a contact member configured to convey the sheet while carrying out a surface treatment of the sheet; a surface property forming unit configured to form, based on a surface treatment datum, a certain surface property on a surface of the contact member by using a surface property forming material; and a sheet heating unit configured to heat the sheet contacting the contact member, to thereby transfer the surface property of the contact member to the sheet.

In the surface treating apparatus under the present invention, the contact member conveys the sheet (which comprises the thermoplastic resin layer) while carrying out the surface treatment of the sheet. The surface property forming unit forms, based on the surface treatment datum, the certain surface property on the surface of the contact member by using the surface property forming material. The sheet heating unit heats and presses the sheet contacting the contact member, to thereby transfer the surface property of the contact member to the sheet. As a result, a specific sheet (such as a transfer sheet) or an intermediate transfer body is not necessary. With the above, by using a simple unit, a desired surface property can be easily and effectively given to the sheet. Hereinabove, the sheet is at least one selected from the group consisting of an ink-jet sheet, a heat sensitive recording sheet, a heat developing sheet, an electrophotographic sheet, and a silver halide photographic sheet while the desired surface property includes gloss, mat, semimat, emboss, luster and the like.

Under the present invention, an image recording apparatus according to its first aspect comprises: an image recording unit configured to record an image on a sheet; and a surface treating unit configured to carry out a surface treatment of the sheet on which the image is recorded by the image recording unit.

Under the present invention, the image recording apparatus according to its first aspect has the image recording unit and the surface treating unit which carries out the surface treatment of an image print recorded by the image recording unit. With the above, an image recording process having a heating process enables heating and pressing soon after the heating process, allowing the image print to be in condition of being preheated by the image recording process. This condition can efficiently save the energy by the preheat. Moreover, the image recording unit in combination with the surface treating unit can increase printing speed.

Under the present invention, an image recording apparatus according to its second aspect comprises: a surface treating unit configured to carry out a surface treatment of a sheet; and an image recording unit configured to record an image on the sheet having a surface treated by the surface treating unit.

Under the present invention, the image recording apparatus according to its second aspect carries out the image recording of the sheet after the surface treatment, thereby making it possible to easily carry out the image printing of a desired surface property on a cheap sheet.

DESCRIPTION OF THE PREFERRED EMBODIMENTS (Surface Treating Apparatus)

A surface treating apparatus under the present invention has a sheet, a contact member, a surface property forming unit and a sheet heating unit, other units such as a sheet cooling unit, a cleaning unit, and when necessary still other unit(s).

Sheet

The sheet has sequential members, that is, a base, and a thermoplastic resin layer and an image recording layer which are disposed on the base. Moreover, when necessary, the sheet under the present invention may have other layers such as a surface protective layer, an intermediate layer, an undercoat layer, a cushion layer, a charge regulating (preventing) layer, a reflective layer, a hue regulating layer, a preservability improving layer, an adhesive preventing layer, an anti-curl layer, a smoothing layer, and the like.

Figure 1:
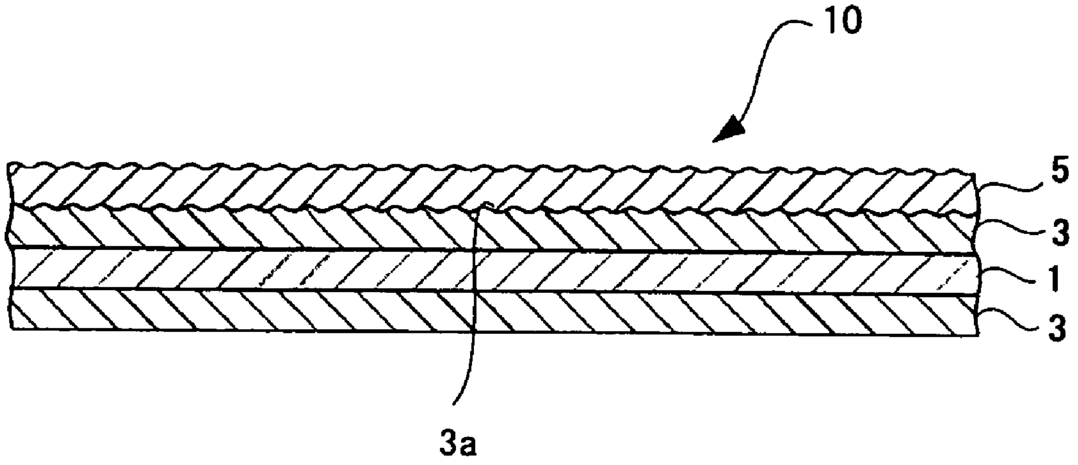
FIG. 1 is a schematic cross sectional view of a sheet according to an embodiment under the present invention.
Figure 3:
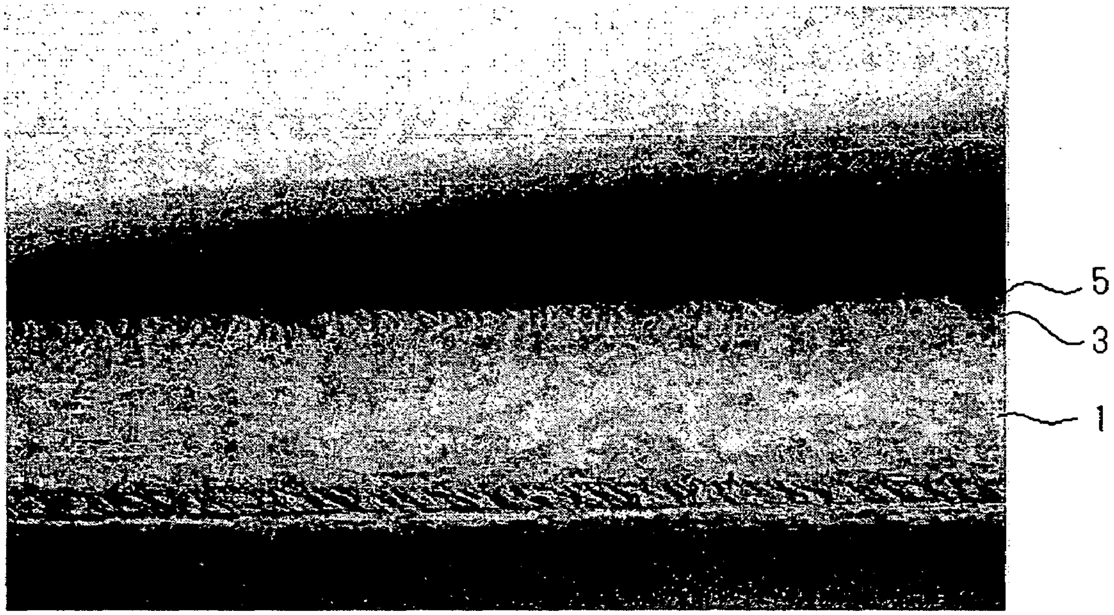
FIG. 3 is a cross sectional photograph of an example of a sheet after a surface treatment under the present invention.

Referring to FIG. 1 showing a sheet 10, a surface treating apparatus (not shown) can transfer a surface property of a contact member to a surface of an image recording layer 5 and a boundary face 3*a* (on the image recording layer (5)'s side) of a thermoplastic resin layer 3. The above can be shown in a cross sectional photograph (magnification: 138) in FIG. 3. Specifically, in a cross section of the sheet 10 after a surface treatment, deformation of the thermoplastic resin layer 3 may involve deformation of the image recording layer 5, thus transferring the surface property of the contact member to the thermoplastic resin layer 3 and also to the image recording layer 5. It is verified that the image recording layer 5 is substantially constant in thickness after the surface treatment.

Figure 2:
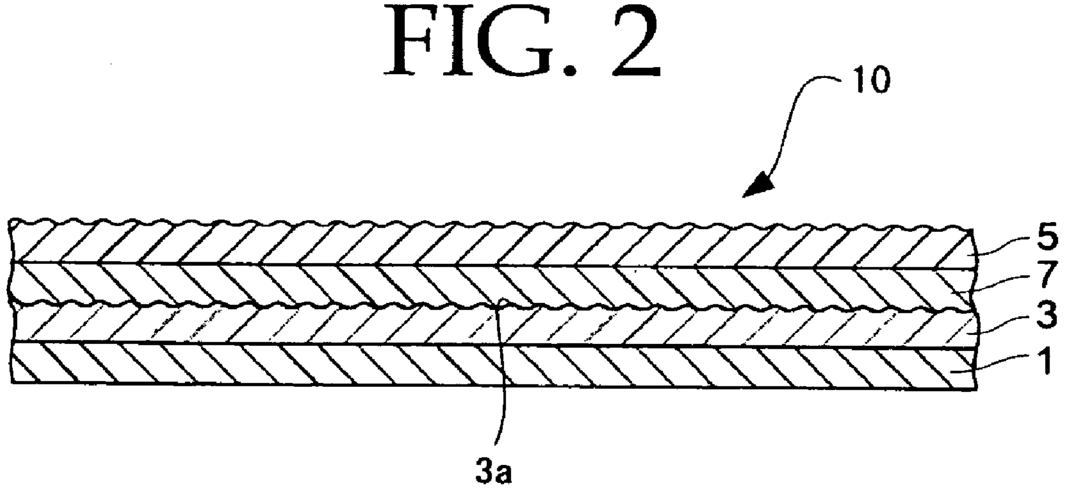
FIG. 2 is a schematic cross sectional view of a sheet according to another embodiment under the present invention.

Moreover, as is seen in FIG. 2, the sheet 10 has an intermediate layer 7 sandwiched between the thermoplastic resin layer 3 and the image recording layer 5. In this case, the surface property of the contact member can be transferred to the surface of the image recording layer 5 and a boundary face 3*a* (with the intermediate layer 7) of the thermoplastic resin layer 3.

Base

The base is not specifically limited, and can be properly selected according to an object. Examples of the base include paper, plastic sheet, plastic film, cloths, metal, glass and the like, to be used alone or in combination of two or more as layer.

Examples of the paper include synthetic paper (e.g., polyolefine, polystyrene, and the like), woodfree paper, art paper, (both sides) coat paper, (both sides) cast coat paper, mixed paper machined from a synthetic resin pulp (polyethylene and the like) and a natural pulp, Yankee paper, baryta paper, wall paper, lining paper, synthetic resin-contained paper, emulsion-contained paper, synthetic rubber latex-contained paper, synthetic resin-added (inner addition) paper, plate paper, cellulose fiber paper, and the like.

Examples of materials of the plastic sheet or the plastic film include polyolefine, polyvinyl chloride, polyethylene terephthalate, polystyrene methacrylate, polyethylene naphthalate, polycarbonate, polyvinyl chloride, polystyrene, polypropylene, polyimide, celluloses (such as triacetyl cellulose and the like), and the like.

Hereinabove, the plastic film or the plastic sheet may be subjected to a treatment for giving thereto a white color reflectivity (for example, a treatment for allowing the film to contain a pigment such as titanium oxide and the like).

Preferable examples of the base further include those disclosed on page 29 to page 31 in JP-A No. 62-253159, on page 14 to page 17 in JP-A No. 1-61236, in JP-A No. 63-316848, JP-A No. 2-22651, JP-A No. 3-56955, U.S. Pat. No. 5,001,033, and the like.

Thickness of the base is not specifically limited, and therefore can be properly selected according to an object, preferably 25 μm to 300 μm, more preferably 50 μm to 260 μm and especially preferably 75 μm to 220 μm.

To the base, various additives which are properly selected can be added within a scope not losing the object and the effect of the present invention.

Examples of the additives include whitening agent; conductive agent; filler; pigment such as titanium oxide, ultramarine, carbon black and the like; dye; and the like.

At least one face of the base may be subjected to various treatments or an undercut for the purpose of improving adhesion with a layer to be formed on the base.

Examples of the surface treatment include glossing treatment; embossing treatment such as fining, matting, tweed and the like disclosed in JP-A No. 55-26507; activating treatment such as corona discharge, flaming, glow discharge, plasma discharge and the like; and the like.

The above surface treatments may be carried out alone. Otherwise, the activating treatment can be carried out after the embossing treatment and the like. Moreover, the undercoat treatment can be carried out after the surface treatment such as the activating treatment and the like. In sum, arbitrary combination are allowed.

Examples of the under coat treatment of at least one face of the base include those carrying out coating of an undercoat solution which contains hydrophilic binder, semiconductor metal oxide such as aluminasol, tin and the like, carbon black, and other charge preventing agent.

Thermoplastic Resin Layer

The thermoplastic resin is not specifically limited, and therefore can be properly selected according to the object. Examples of the thermoplastic resin include polyolefine, polyvinyl chloride, polyethylene terephthalate, polystyrene, polymethacrylate, polycarbonate, polyimide, triacetyl cellulose, and the like. Among the above, the polyolefin is preferable. These can be used alone or in combination of two or more.

In general, the above polyolefine is preferably a low-density polyethylene. Examples of the polyolefine for improving heat resistance of the base include (1) polypropylene, (2) blend of polypropylene with polyethylene, (3) high-density polyethylene, (4) blend of high-density polyethylene with low-density polyethylene, and the like. Among the above, from the view point of cost and laminating property and the like, the blend of the high-density polyethylene with the low-density polyethylene is especially preferable.

Mixture ratio (mass) of the high-density polyethylene to the low-density polyethylene is preferably 1/9 to 9/1, more preferably 2/8 to 8/2, and especially preferably 3/7 to 7/3. In the case of forming the thermoplastic resin layer on both sides of the base, a backface of the base is preferred to use the high-density polyethylene or the blend of the high-density polyethylene with the low-density polyethylene. The high-density polyethylene and the low-density polyethylene described above are preferred to have their melt index of 1.0 g/10 minute to 40 g/10 minute and have extruding property.

The sheet and the film described above may be subjected to a treatment for giving thereto the white reflectivity.

Examples of the white reflectivity treatment include a process of blending pigment such as titanium oxide in the sheet and the film.

Image Recording Layer

For example, in the case of silver salt photograph, the image recording layer is an emulsion layer coloring YMC (yellow, magenta and cyan). Under the present invention, the image recording layer denotes both an emulsion layer before an exposure development and the emulsion layer after the exposure development. In the case of an ink-jet, the image recording layer is an ink receiving layer (receiving and holding ink). Under the present invention, the image recording layer denotes both an ink receiving layer before an ink adhesion and the ink receiving layer after the ink adhesion. In the case of electrophotography, the image receiving layer is a toner receiving layer for receiving toner. Under the present invention, the image recording layer denotes both a toner receiving layer before a toner adhesion and the toner receiving layer after the toner adhesion.

The above sheet is not specifically limited, and therefore can be properly selected according to the object. Examples of the sheet include an ink-jet sheet, a heat sensitive recording sheet, a heat developing sheet, an electrophotographic sheet, a silver halide photographic sheet, and the like. The above sheet may be the one before the image recording or the another after the image recording.

The ink-jet sheet may, for example, have at least a colorant receiving layer on the base. Liquid inks (using dye or pigment as colorant) such as an aqueous ink, an oil ink, and the like; solid inks which are solid at an ordinary temperature and are melted and liquefied for printing; and the like may be absorbed in the colorant receiving layer, to thereby record an image.

The above electrophotographic sheet, for example, has at least a toner receiving layer which receives at least one selected from a color toner and a black toner, thus forming an image.

Examples of the heat sensitive recording sheet include the one disclosed in JP-A No. 6-130632. Specifically, (1) disclosing a constitution including a base, and at least a heat-melt ink layer as an image recording layer disposed on the base; and disclosing a process of heating the heat-melt ink layer by a heat sensitive head and transferring an ink from the heat-melt ink layer to a heat sensitive recording sheet, (2) disclosing a constitution including a base, and at least an ink layer disposed on the base and containing a heat diffusive pigment (sublimation pigment); and disclosing a process of heating the ink layer by a heat sensitive head and transferring the heat diffusive pigment from the ink layer to a heat sensitive recording sheet, (3) disclosing a constitution including a base, and at least a heat-coloring layer disposed on the base; and disclosing a process of recording an image by repetitions of heatings by heat sensitive head and fixings by ultraviolet ray (referred to as thermo autochrome process (TA process)), and the like.

Contact Member

The contact member is not specifically limited in terms of its configuration, constitution, size, material and the like, and therefore can be properly selected according to the object. Examples of the contact member include a sheet, an endless belt and the like which are cut to a desired size. In the case of the sheet, the advantage is that a surface condition is variable per the thus cut sheet. In the case of the endless belt, the advantage is that continuous treatments are easy and peeling of the sheet from the endless belt is easy.

For using the endless belt as the contact member, the endless belt is preferred to have its surface smoothed.

For using the endless belt as the contact member, the sheet heating unit is especially preferred to have the endless belt, and a pair of heat rollers disposed so as to place the endless belt in pressure contact from its inner side and outer side.

While conveying the sheet, the endless belt may transfer the surface property (irregularity) thereof to the surface of the sheet.

Hereinabove, the endless belt is not specially limited, and therefore can be selected according to the object. Examples of the endless belt include the one used for a belt fixing apparatus of a known image forming apparatus. The size, material, and the like of the endless belt are not specifically limited, and therefore can be properly selected from those known in the art according to the object. The material of the endless belt is preferred to have a heat resistance, which heat is a temperature substantially equal to or more than a softening point of the thermoplastic resin of the thermoplastic resin layer of the sheet. Examples of the endless belt include polyethylene, terephthalate, polyethylene, polypropylene, nylon, polyimide, polystyrene, fluorinated olefin, and the like.

For the purpose of obtaining a good peeling property, the surface of the endless belt is preferred to have a peeling layer which contains at least one material selected from silicone rubber, fluoro rubber, silicone resin, and fluorinated resin.

Examples of the peeling layer include (1) a primary aspect having a fluorocarbon siloxane rubber layer, (2) a secondary aspect having a silicone rubber layer, and (3) a tertiary aspect having a fluorocarbon siloxane rubber layer on the silicone rubber layer.

Surface Property Forming Unit

The surface property forming unit described above is a unit for forming, based on a surface treatment data, the desired surface property on a surface of the contact member, by using the surface property forming material.

The surface treatment data is developed by the following operations: reading the sheet subjected to an image recording, to thereby obtain an image data, selecting a certain surface property data corresponding to the image data, and developing the certain surface treatment data based on the certain surface property data.

The surface property data is not specifically limited, and therefore can be selected according to the object, the examples thereof including at least one selected from i) type of the surface property, ii) range of the surface property and iii) degree of surface property.

Examples of the type of the surface property preferably include at least one of gloss, mat, semimat, emboss, luster, and a combination of the above.

Examples of the range of the surface property include a part (main object, background and the like) of the image print, and an overall range of the image print.

Examples of the degree of the surface property include image quality, scale of irregularity, amount of dent, amount of protrusion, distribution of irregularity (dent and protrusion), and the like. The degree of the surface property is preferred to have several steps according to the types of the surface property.

The surface property data is not specifically limited, and therefore can be properly selected according to the object. Examples of the surface property data include the one that is formed by designating a desired surface property data to an image data obtained by reading the sheet an image of which is recorded.

An image reading unit for reading the sheet the image of which is recorded is not specifically limited, and therefore can be properly selected according to the object. Examples of the image reading unit include film scanner, reflective scanner, CCD (charge coupled device) sensor, CMOS (complementary metal oxide semiconductor) sensor, and the like. Examples of the CCD sensor include a line CCD scanner, an area CCD scanner, and the like.

Moreover, examples of the above surface property data include an image data photographed with a digital still camera (DSC), an image data captured from a digital video (DV), an image data inputted to a personal computer and the like, an image data inputted from mobile data terminal, an e-mail, a telephone line, a server on network, and the like. The above surface property data may be used alone or in combination of two or more.

Making the surface property data may be carried out by designating a desired surface property data to the image data displayed on the a display unit. Herein, the designating of the surface property data may be carried out based on determination of the operator. Moreover, area selection on the image print is carried out automatically. When the operator designates a certain area, the same area is to be subjected to the same surface treatment. In this case, however, area recognition may be varied, according to the operator's selection.

The display unit for displaying the image data is not specifically limited, and therefore can be selected according to the object, examples thereof including a cathode ray tube (CRT) monitor, a liquid crystal monitor, and the like.

Making of the surface property data is preferred to be carried out in the following manner: the operator designates the surface property to the image data displayed on the display unit, to thereby vary a texture display of the image data displayed. Hereinabove, the texture display denotes a process of giving feeling and the like by setting up material, light source and the like for the thus displayed image data.

The process of designating the surface property data is not specifically limited, and therefore can be properly selected according to the object, examples thereof including (1) designating with a mouse an image data displayed on the monitor, (2) inputting with a keyboard, (3) pressing by finger on the monitor image, and the like.

As described above, the surface properties including gloss, mat, emboss and the like are to be registered as "typical surface properties," thus memorizing preliminarily in a memory section respective irregularity conditions such as size of irregularity, amount of dent, amount of protrusion, distribution of irregularity (namely, dent and protrusion), and the like. The operator designating the "typical surface properties" may allow a controlling section to read out corresponding irregularity conditions from the memory section, thus saving time for manually inputting the irregularity conditions which are complicated. Moreover, arbitrarily setting up complicated irregularity conditions is allowed including fine adjustment.

As the case may be, for patterns that are not registered as the "typical surface properties," the operator can directly input the irregularity conditions therefor.

As long as having an ability of forming the surface property on the contact member, the surface property forming material is not specifically limited, examples thereof including ultraviolet (UV) curing ink, wax ink, foaming ink, phase change ink, and the like.

The UV curing ink is not specifically limited, and therefore can be properly selected according to the object from those conventionally known. Examples of the UV curing ink include an ink-jet type UV curing ink disclosed in JP-A No. 4-2973 and JP-A No. 2000-504778.

Ejecting the above UV curing ink by means of, for example, a piezo-drive ink-jet head can easily and effectively form the surface property corresponding to the image.

Exposing an ultraviolet (UV) ray to the thus ejected UV curing ink can cure the UV curing ink. The irradiation of the UV ray is preferably given 10 $mJ/cm^2$ to 2000 $mJ/cm^2$ of energy, and more preferably 100 $mJ/cm^2$ to 10000 $mj/cm^2$ of energy. Examples of UV lamps used for the UV curing include mercury lamp, high pressure mercury lamp, ultrahigh pressure mercury lamp, metal halide lamp, and the like.

As long as being ejectable by an ink-jet method, the wax ink is not specifically limited, and therefore can be properly selected according to the object from those conventionally known. Since being subjected to a heating-pressing in the transferring of the surface property to the sheet, the wax ink is preferred to be free from being melted at a heating temperature in the transferring.

The wax ink is to contain at least wax, resin binder, viscosity additive, and may contain other compositions when necessary.

Examples of the wax include paraffin wax, carnauba wax, synthetic wax, microcrystalline wax, low molecular polyethylene, higher aliphatic acid and derivative thereof, and the like.

Examples of the resin binder include polyethylene, polystyrene, polypropylene, polyvinyl chloride, polyvinyl acetate, polyvinyl alcohol, polyvinyl butyral, polyvinylidene chloride, polymethacrylic resin, polyester, polyamide, copolymers thereof, and the like.

Examples of the viscosity additive include rosin and derivative thereof, polyterpene, and the like.

Examples of the other compositions include dye, charge preventive agent, dispersing agent, lubricant, and the like, which can be used in combination.

The dye may be properly selected from those conventionally known, examples thereof including direct dye, acid dye, dispersive dye, oil-soluble dye, and the like.

The process of forming the surface property on the contact member using the wax ink is not specifically limited, and therefore can be properly selected according to the object from those conventionally known. Example thereof include (1) hot-melt coating of the wax ink, (2) carrying out solvent coating, i.e., coating solution in which the wax ink is dissolved or dispersed, (3) using an ink-jet head for ejecting the wax ink to thereby form the surface property, and the like. Among the above, the ink-jet process in (3) is preferable in terms of fine formation conforming to the image.

The phase change ink (hot-melt ink) is not specifically limited, and therefore can be properly selected according to the object, examples thereof including resin, wax, synthetic wax, colorant, oxidation inhibitor and the like, and other compositions when necessary.

Examples of the resin include hydrogenated terpene resin, terpene phenol copolymer, polyamide resin, and the like. The above resins are preferred to be as low as possible in viscosity, since the hot-melt ink composition is to be ejected by the ink-jet process for printing.

Preferably, the wax has lower viscosity than the above resins, and acts as diluent, examples thereof including rosin-modified wax, aliphatic amide, ethylene bisoleamide, N-stearyl stearamide, behenic acid amide, stearamide, distearamide, distearyl ketone, and the like.

Mainly, the above synthetic wax may operate as wear resistance (hardness) giver to the ink, and may also have operations as diluent, dye solvent and the like. The synthetic wax is preferred to be a synthetic polyolefin wax. Since being ejected by the ink-jet process for printing, the synthetic wax is especially preferred to have high hardness and low viscosity, preferable examples thereof including full-saturation ethylene homopolymer, full-saturation long-chain alcohol, synthetic hydrocarbon wax, and the like. Having functional group, the above full-saturation long-chain alcohol has solubility in oil-soluble dye.

The wax is used as diluent of the hot-melt ink composition. Therefore, the oil-soluble dye that shows high solubility in the wax is to be used as colorant. Examples of the oil-soluble dye include copper phthalocyanine dye, xanthene dye, and the like.

The oxidation inhibitor is for inhibiting composition of the hot-melt ink from being deteriorated by oxidation, examples thereof including hindered phenol oxidation inhibitor ((3,5-di-butyl-4-hydroxy phenyl)propionate) and the like.

Used as the foaming ink include the one in which foaming agent is blended which agent may be foamed by inflation, decomposition, reaction and the like attributable to irradiation (of ultraviolet ray and electron beam) and heat.

Examples of the foaming agent include (1) particles of thermoplastic resin encapsulating or containing inflating agent, and having low gas permeability, (2) pyrolytic foaming agent, and the like.

Examples of the particles of thermoplastic resin encapsulating or containing inflating agent, and having low gas permeability is not specifically limited, preferably having the particle diameter of 1 μm to 500 μm more preferably 10 μm to 100 μm. The above particle is preferred to be shaped substantially into a sphere.

Examples of the inflating agent include low molecular hydrocarbons such as propane, butane, isobutane, pentane, isopentane, neopentane, hexane, heptane, and the like; halogenated hydrocarbons such as trichloro monofluoro methane, dichloro difluoro methane, dichloro tetrafluoro ethane, and the like; petroleum ether; and the like.

Content of the inflating agent is not specifically limited, and therefore can be properly selected according to the object, preferably being 10 mass % to 50 mass %.

Examples of the thermoplastic resin used for the foaming agent include resins having low gas permeability such as polyvinylidene chloride, polyacrylonitrile, polyester, polyamide, polyurethane, polycarbonate, and the like. Examples of the above thermoplastic resin for reformation include divinyl benzene, esters of methacrylate, ester vinyl acetate of acrylic acid, vinyl chloride, styrene and the like, which can be combined with various polymerization initiators and stabilizer. The above foaming agent can be produced, for example, by i) a first step of mixing a low boiling point liquid inflating agent with a monomer of thermoplastic resin and ii) a second step of suspension polymerization under an applied pressure.

The above (2) pyrolytic foaming agent is not specifically limited, and therefore can be properly selected according to the object, examples thereof including azodicarun amide, azobisisobutyro nitrile, diazo amino benzene, N,N'-dinitroso pentamethylene tetramine, N,N'-dimethyl-N,N'-dinitro terephthal amide, benzene sulfonyl hydrazide, salt of sodium hydrogen bicarbonate, salt of monosodium citrate, combination thereof, and the like.

Examples of the process of producing the foaming ink include (1) using a foaming ink principally made of a thermosetting resin or a reactive setting resin each of which is blended with cross linking agent, curing agent, curing assistant and the like, so as to carry out curing reaction after or substantially simultaneously with foaming of the foaming ink, (2) forming on a surface of the foaming ink a layer made of setting resin, after the foaming of the foaming ink, (3) and the like.

Hereinabove, the foaming ink may contain thermo-foaming agent such as microcapsule and other chemical foaming agent, examples thereof are those conventionally known in the art.

Examples of the thermo-foaming microcapsule include the one that is made by encapsulating liquid foaming agent such as butane and the like in the thermoplastic resin particles such as polystyrene, polyester and the like. The foaming agent featuring the above thermo-foaming property is preferred to have a foaming temperature of 100° C. to 200° C.

In terms of the material for forming the surface property, an ink-jet is preferably used for forming fine surface property on the contact member. Examples of the ink-jet recording head in the above ink-jet process include thermal type head, piezo type head, electrostatic ejecting type head, and the like.

For enduring the heating and the pressing in the surface treatment, the surface property forming material after the curing can, preferably, endure a pressure of 13 kgf/cm$^2$ or more and a temperature of 100° C. or more, thereby forming a precise surface property.

Figure 4:
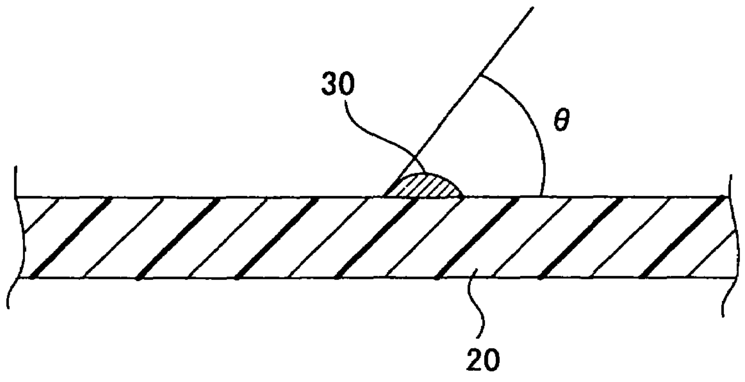
FIG. 4 is a schematic of a contact angle formed by a surface of a contact member and a surface property.

As is seen in FIG. 4, a contact angle θ of the contact member surface relative to a surface property 30 (for example, UV setting ink in a setting state) formed on the contact member surface is preferably 90° or less, and more preferably 20° to 90°. The contact angle more than 90° may cause wraparound of the sheet in the pressing, thus making it difficult to smoothly peel the sheet in the subsequent peeling. The contact angle of 20° to 90° can be unlikely to cause aggregation with adjacent inks, thus bringing about fine irregularities. Moreover, varying the surface property of the belt may control the contact angle, which is an advantage of the contact angle of 20° to 90°.

Herein, the contact angle θ can be measured, for example, by the following steps: i) photograph the state in FIG. 4 (the surface property adhering to the contact member) with a CCD camera, and ii) measure the contact angle θ with an angle meter based on an image obtained in the above step i).

Sheet Heating Unit

The sheet heating unit is not specifically limited, and therefore can be properly selected according to the object. Examples thereof include those used as a fixing unit in the known image forming apparatus, more specifically, a pair of heat rollers disposed so as to place the endless belt in pressure contact from its inner side and outer side.

Up to a temperature more than the softening point of the thermoplastic resin of the thermoplastic resin layer, the above sheet heating unit can heat i) the surface of the image print recording the image on the sheet and ii) the boundary face (on the image recording layer's side) of the thermoplastic resin layer. Also included in the operation of the above sheet heating unit is to cause a pressure for deforming the thermoplastic resin layer.

The pair of the heat rollers are not specifically limited, and therefore can be properly selected according to the object, examples thereof including the ones used for the known image forming apparatus, having an ability of regulating a nip pressure, a heating temperature and the like.

With the pair of the heat rollers, the sheet and the endless belt can be overlapped with each other. In this state, the sheet and the endless belt can be interlocked with the rotation of the pair of the heat rollers, and thereby can pass with a nip portion thereof heated which is formed between the pair of the heat rollers. When the nip portion is pressed, the sheet and the endless belt in the state of being overlapped with each other can pass with the nip portion heated and pressed.

The heating temperature by the sheet heating unit is not specifically limited, and therefore can be properly selected according to the sheet type, examples thereof include a temperature more than the softening point of the thermoplastic resin of the thermoplastic resin layer of the sheet. Ordinarily, the heating temperature is 50° C. to 120° C., and preferably 80° C. to 110° C. When the thermoplastic resin layer has, as its main material, the polyethylene resin, the heating temperature is preferably 95° C. to 105° C. The pressure caused by the sheet heating unit is preferably in a range of 7 kgf/cm$^2$ to 20 kgf/cm$^2$ at the nip portion.

The sheet heating unit can form the irregularity by transferring the surface property of the endless belt to the boundary face (on the image recording layer's side) of the thermoplastic resin layer and to the image recording layer.

Sheet Cooling Unit

As long as having an ability of cooling the sheet treated by the sheet heating unit, the sheet cooling unit is not specifically limited, and therefore can be properly selected according to the object, from those conventionally known. In terms of regulating cooling conditions, the one having an ability of conveying cooling air and of regulating cooling air temperature is preferred. The number of the sheet cooling units and the like are not specifically limited, and therefore can be properly selected according to the object.

The position for disposing the sheet cooling unit is not specifically limited, and therefore can be properly selected according to the object. The position is, however, ordinarily downstream the sheet heating unit in the direction of conveying the sheet. When the sheet heating unit has the pair of the heating rollers and the endless belt, the above position is preferably between the heating rollers and a rotary roller (which, in combination with the pair of the heating rollers, suspends the endless belt in such a manner that the endless belt can rotate) and in the vicinity of the endless belt. In this case, the sheet can be cooled when moving between the pair of the heating rollers and the rotary roller.

The cooling temperature of the sheet cooling unit is preferred to be less than the softening point of the thermoplastic resin of the thermoplastic resin layer of the sheet, ordinarily 70° C. or less.

Cleaning Unit

The cleaning unit is for removing the surface property formed on the contact member, thereby cleaning the contact member. However, in the case that the same surface properties are repeatedly yielded, the cleaning is not carried out, and forming of the surface property on the contact member is not carried out, making it possible to repeatedly use the same contact member. With this, productivity of yielding the surface property by the contact member can be improved.

As long as having an ability of cleaning the surface property (irregularity) formed on the surface of the contact member, the cleaning unit is not specifically limited in terms of size, number, position and the like, and therefore can be properly selected according to the object, examples thereof including scraper, blade, adhesive roller and the like.

When necessary for effective cleaning, the cleaning unit is preferred to be equipped with a belt buffer absorbing linear speed difference.

Moreover, the cleaning unit is preferred to have a belt cleaning portion for cleaning the contact member. The belt cleaning portion may dip the contact member in a solvent capable of dissolving the surface property forming material, thus removing foreign matter from the surface of the endless belt.

Other Unit

The other unit is not specifically limited, and therefore can be properly selected according to the object, preferable examples thereof including a preheating unit, an aligning unit, a treatment controlling unit, and the like.

The preheating unit can preliminarily heat the sheet before the heat treatment by means of the sheet heating unit.

The preheating unit can reduce heating value necessary for the heating-pressing, thus assuredly heating the sheet, which is advantageous.

The preheating unit is not specifically limited, and therefore can be properly selected according to the object, preferable examples thereof including heating roller, heater, heating portion of the image recording apparatus (such as a drying potion of minilab of silver salt photograph, a fixing portion of electrophotographic apparatus, and the like), and the like.

The above aligning unit is for aligning the sheet relative to the contact member, when overlapping the sheet with the contact member. The above aligning unit can prevent positional deviation of the sheet from the contact member in the surface treatment, thus making the surface treatment efficient and assured, which is advantageous.

The aligning unit is not specifically limited, and therefore can be properly selected according to the object, examples thereof including a set of i) a sensor (for sensing phase of the endless belt) and ii) a sensing portion and a driving portion which carry out the alignment based on the result of the sensing by the sensor. The sensor is not specifically limited, and therefore can be properly selected according to the object, examples thereof including a sensor sensing reflected light, a sensor sensing reflected noise, and the like.

The treatment controlling unit is for controlling each of the steps.

As long as having an ability of controlling movement of each of the units, the treatment controlling unit is not specifically limited, and therefore can be properly selected according to the object, examples thereof including equipments such as sequencer, computer, and the like.

For preventing twist and looseness of the endless belt, the treatment controlling unit is preferred to have a sensing mechanism for sensing the twist of the endless belt. Examples of the sensing mechanism include a sensor for sensing the twist and the looseness of the endless belt. More preferably, the treatment controlling unit is provided with a belt twist recovering unit.

(Image Recording Unit)

Under the present invention, the image recording apparatus according to its first aspect is provided with the image recording unit and the surface treating unit (namely, in the above order) and, when necessary, is provided with other unit(s) properly selected.

The image recording unit according to its first aspect is so constituted as to allow the surface treating apparatus to transfer the surface property of the endless belt to the sheet after the image recording, thus continuously carrying out the image recording and the surface treatment efficiently.

The image recording apparatus according to its first aspect is preferable when using, as a sheet, any one of a silver halide photographic sheet, a heat developing sheet, a heat sensitive recording sheet, and an electrophotographic sheet.

Under the present invention, the image recording apparatus according to its second aspect is provided with the surface treating unit and the image recording unit (namely, in the above order) and, when necessary, is provided with other unit(s) properly selected.

The image recording unit according to its second aspect is so constituted as to allow the surface treating apparatus to transfer the surface property of the endless belt to the sheet before the image recording.

The image recording unit according to its second aspect is preferable for ink-jet sheet which is used as the sheet.

The ink-jet sheet has the base, and at least a colorant receiving layer disposed on the base. The above ink-jet sheet is for recording an image by absorbing at least one of the following inks in the colorant receiving layer: liquid inks (using dye or pigment as colorant) such as an aqueous ink, an oil ink, and the like; solid inks which are solid at an ordinary temperature and are melted and liquefied for printing; and the like.

Image Recording Unit

As long as having an ability of recording the image on the sheet, the image recording unit is not specifically limited, and therefore can be properly selected according to the object from those known in the art, examples thereof including an ink-jet recording process, a heat sensitive recording process, a silver halide photographic process, a heat developing process, an electrophotographic process, and the like.

Surface Treating Unit

The surface treating unit is not specifically limited, and therefore can be properly selected according to the object, example thereof being the surface treating apparatus described above under the present invention.

In the image recording apparatus, the surface treating unit is allowed to be incorporated in the image recording unit or to be fitted outside the image recording unit.

The other unit(s) is not specifically limited, and therefore can be properly selected according to the object, examples thereof including the controlling unit and the like.

The controlling unit is not specifically limited, and therefore can be properly selected according to the object, examples thereof including those used in the conventional image recording apparatus. Specifically, the examples include the one that can drive or stop the surface treating unit and control (determine) whether or not the surface treatment is carried out on the sheet. Instead of an independent unit, the above treatment controlling unit of the surface treating apparatus may accomplish the function of the controlling unit described herein.

In the case of using the controlling unit described herein: Stopping operation of the surface treating unit, the controlling unit can eject the image (formed by means of the image recording unit), without the image passing through the surface treating unit. This is referred to as a bypass route. Driving the surface treating unit can eject the image (formed by means of the image recording unit) from the image recording apparatus after the surface treatment of the image through the surface treating unit.

The image recording apparatus under the present invention can form a desired surface property (such as gloss, mat, semimat, emboss, luster and the like) substantially entirely or partly on the surface of the thus obtained image. Moreover under the present invention, even the same image can have differences in terms of the surface gloss.

Described specifically hereinafter is an embodiment of the present invention. The present invention is, however, not limited thereto.

Embodiment

According to the embodiment, the known ink-jet recording apparatus is used for the image recording. In FIG. 1, as a sheet, an ink-jet sheet is used having raw paper 1 and a polyethylene resin layer 3 disposed on both sides of the raw paper 1, and an ink receiving layer 5 acting as an image receiving layer and disposed on a surface (upper in FIG. 1) of the polyethylene resin layer 3.

Figure 5:
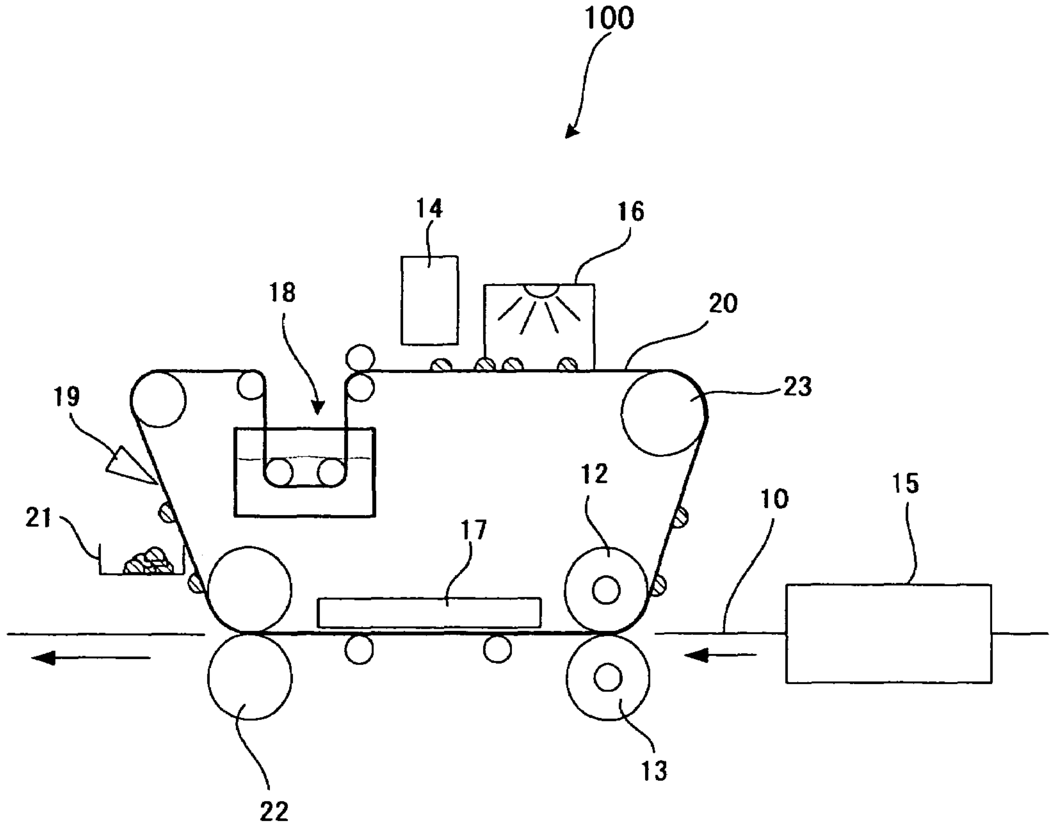
FIG. 5 is a schematic of an example of a surface treating apparatus under the present invention.

The image recording apparatus according to the embodiment is, as is seen in FIG. 5, provided with an image recording unit 15 and a surface treating unit 100.

The ink-jet recording apparatus as the image recording unit can yield a sheet 10 (image print) by carrying out an image recording of the ink-jet sheet.

As is seen in FIG. 5, the surface treating unit 100 includes an endless belt 20, an ink-jet recording head 14 acting as a surface property forming unit and ejecting a UV setting ink, a heating roller 12 as a sheet heating unit, a pressing roller 13 also as the sheet heating unit, and a cooling apparatus 17 as a sheet cooling unit. In FIG. 5, there are provided a UV irradiating apparatus 16 for setting the UV setting ink, and a scraper 19 as a cleaning unit.

In the surface treating unit 100, the ink-jet recording head 14 and the UV irradiating apparatus 16 are preferred to be disposed within a horizontal range of the endless belt 20 and on or above the endless belt 20. With the above constitution, the ink can be stably ejected and a behavior of the UV setting ink after being adhered may be stabilized, thus preventing an aggregation of droplets, a liquid flow, and the like. With this, high-density and high-precision surface property can be formed.

The heating roller 12 and the pressing roller 13 are used as the sheet heating unit. The sheet 10 can be heated and pressed by means of the heating roller 12 and the pressing roller 13, thereby the surface property formed on the endless belt 20 can be transferred to the sheet 10. The above heating and the pressing are preferred to be carried out at such a temperature as to soften and deform the thermoplastic resin layer of the sheet 10. Herein, such a constitution is allowed as uses a roller 23 to preheat the endless belt 20 thereby reducing duty of the heating roller 12 and the pressing roller 13.

As long as having an ability of cooling and solidifying the thermoplastic resin layer of the sheet 10 that is heated and pressed, the cooling unit (cooling apparatus 17) is not specifically limited, and therefore can be properly selected from those conventionally known in the art. According to the embodiment, the cooling apparatus 17 conveying a cooling air is used for cooling the thermoplastic resin layer of the sheet 10 to a temperature less than or equal to the softening point, specifically, 70° C. or less.

As the cleaning unit, the scraper 19 made of resin can be used. The scraper 19 can peel off the surface property formed on the surface of the endless belt 20, then, the surface property may be received in a receptacle tray 21, thereby carrying out the cleaning without damaging the endless belt 20. Moreover, the endless belt 20 after the cleaning may be washed with a belt washing portion 18 when necessary for the purpose of deleting any foreign matter remaining on the surface of the endless belt 20. The scraper 19 and the tray 21 are detachable, which is easy for maintenance and disposal (scrap).

Figure 6:
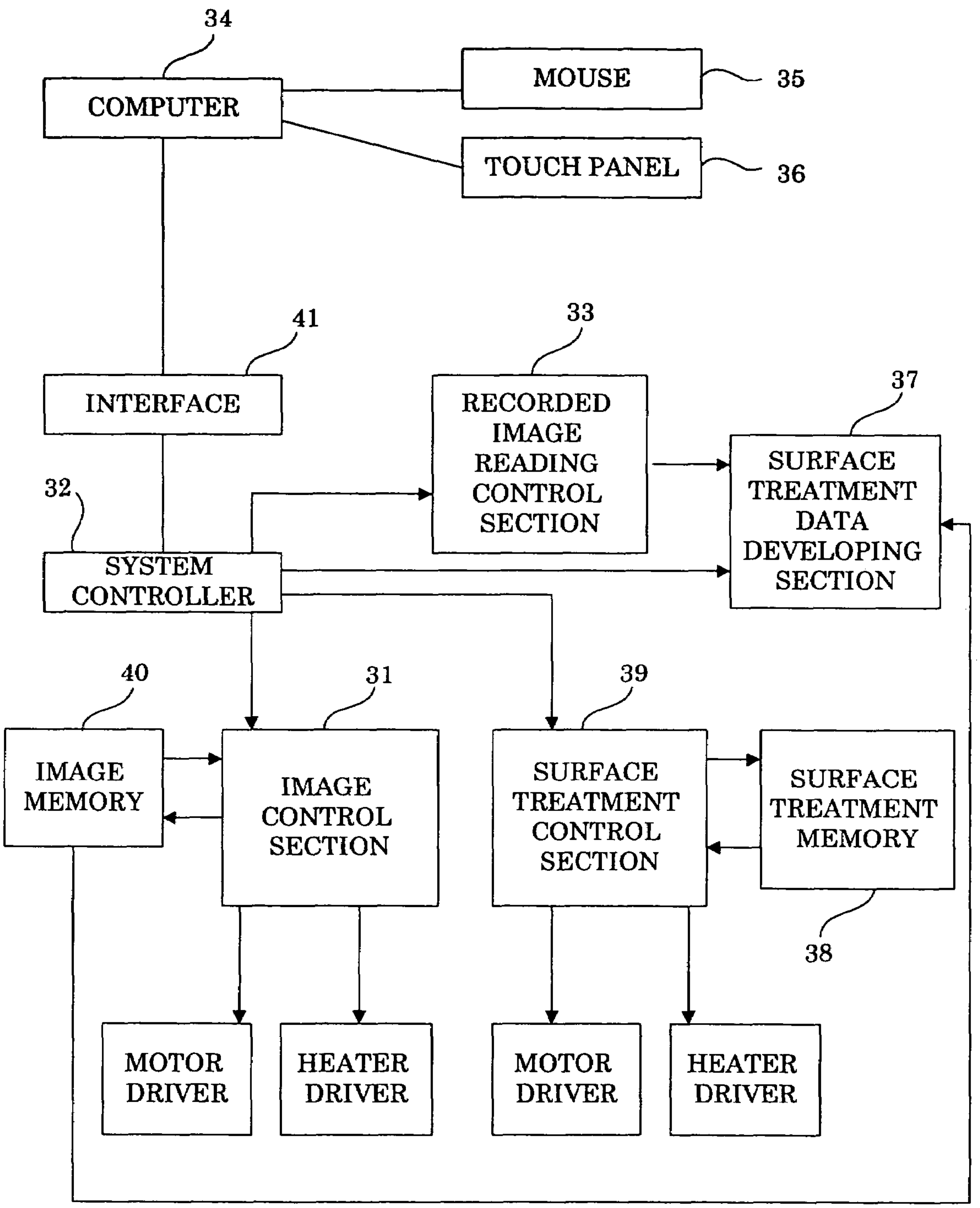
FIG. 6 is a schematic of an example of an image recording apparatus equipped with the surface treating apparatus under the present invention.

Hereinafter described is the surface treatment using the image recording apparatus equipped with the surface treating apparatus. As is seen in FIG. 6, controlling with a system controller 32 can operate an image control section 31, to thereby record a desired image on the sheet 10. The thus recorded image data is stored in an image memory 40.

On the other hand, controlling with the system controller 32 can operate a recorded image reading control section 33, to thereby read in an image recording face of the sheet 10 (whose image is recorded) by means of a scanner (not shown) as an image reading unit. Then, the image data may be displayed on a monitor of a computer 34 connected to the system controller 32 via an interface 41. Then, an operator may select a desired surface property data (i. type of the surface property, ii. range of the surface property, and iii. degree of the surface property) by operating one of a mouse 35 and a touch panel 36, corresponding to the image data displayed on the monitor.

According to this embodiment, at least one of gloss, mat, semimat, emboss, luster, and a combination of the above can be selected for the type of the surface property. For the range of the surface property, an automatic sampling or a manual sampling can be selected, to thereby select the image print partly or entirely. For the degree of the surface property, scale of the irregularity and distributions (large, intermediate, and small) of the irregularity can be selected.

With the selected surface property data and the image data stored in the image memory 40, a surface treatment data developing section 37 can develop a surface treatment data to be stored in a surface treatment memory 38. Then, the surface treatment data read out from the surface treatment memory 38 may be conveyed to a surface treatment control section 39 such that the surface property forming unit (motor driver, heater driver and the like) can be operated, to thereby form the surface property on the surface of the endless belt 20. In the case of using the UV setting ink as the surface property forming material, for example, operating the ink-jet record head 14 can eject the UV ink on the endless belt 20, based on the surface property data thus developed. Then, the thus ejected UV setting ink is irradiated and solidified by means of the UV irradiating apparatus 16, to thereby form the surface property on the endless belt 20. According to the embodiment, the UV setting ink is the one disclosed in JP-A No. 2003-221530. The contact angle θ measured by the following steps is about 20° between the surface of the endless belt 20 and the surface property which is formed by the UV setting ink.

Steps for measuring contact angle θ:

i) photograph the state in FIG. 4 (the surface property 30 adhering to the endless belt 20) with a CCD camera.

ii) measure the contact angle θ with an angle meter based on an image obtained in the above step i).

The sheet 10 (image print) after the surface treatment is to be inserted into a nip portion formed between the heating roller 12 and the pressing roller 13 for the heating and the pressing. Herein, the heating roller 12 and the pressing roller 13 are, as is seen in FIG. 5, heated up to such a temperature as to soften the thermoplastic resin layer of the sheet 10. The sheet 10 thus inserted into the nip portion is heated up to such a temperature as to soften and deform the thermoplastic resin layer. Then, the thermoplastic resin layer may get softened at the nip portion, to become deformable. Herein, the nip portion may be pressed by means of the heating roller 12 and the pressing roller 13, thus pressing both sides of the sheet 10 passing the nip portion. With this, the thermoplastic resin layer (of the sheet 10) in its most softened state may be deformed while being pressed by the heating roller 12 and the pressing roller 12, thereby transferring the surface property of the endless belt 20 to the sheet 10. Then, the thermoplastic resin layer may pass by the nip portion for conveyance.

Next, being in a state of adhering to the surface of the endless belt 20, the sheet 10 may be cooled by the cooling apparatus 17, to thereby solidify the thermoplastic resin layer thereof. Then, the sheet 10, as is, may be conveyed to a rotary roller 22. Around the rotary roller 22, the direction of conveying the endless belt 20 may vary by as great as about 80°, thus peeling the sheet 10 from the surface of the endless belt 20 that is varying suddenly the direction of conveyance. The sheet 10 thus peeled off from the endless belt 20 may be conveyed subsequently by means of rotation of a conveying roller (not shown), to be ejected to an ejection tray (not shown). According to the embodiment, the sheet 10 is in no need of a peeling nail and the like.

The endless belt 20 after the surface treatment may have the surface property thereof scraped by means of the scraper 19. When necessary, the endless belt 10 may be washed by the belt washing portion 18, to be followed by drying for reuse.

Although not shown, the image recording apparatus that is not subjected to the surface treatment may have one of the following constitutions: i) putting aside the surface treating apparatus so as to prevent the sheet 10 from passing through the surface treating apparatus, and ii) placing a bypass for the sheet 10 to avoid the surface treating apparatus, and so setting the controlling unit as to allow the sheet 10 to pass through the bypass.

The above wraps up details about the surface treating apparatus and the image recording apparatus according to the embodiment under the present invention. The present invention is, however, not limited to the embodiment. Variations and modifications may be made in the invention without departing from the spirit and scope thereof.

The surface treating apparatus under the present invention can easily and effectively yield a desired surface property corresponding to the image information about various sheet bodies. The image recording apparatus under the present invention having the surface treating apparatus under the present invention can effectively give a desired surface property to various sheet bodies selected from an ink-jet print, a heat sensitive recording print, a heat developing print, an electrophotographic print and a silver halide photographic print, providing high added value image print.

What is claimed is:

1. A surface treating apparatus, comprising:

a sheet which comprises a base, and a thermoplastic resin layer disposed on the base, the thermoplastic layer having a softening temperature;

a sheet surface forming unit having a contact member configured to contact and convey the sheet;

a pressing surface forming unit configured to form a pressing surface on a contact area of the contact member, by depositing a material onto said contact area in a manner to form the pressing surface to have a surface property according to a sheet surface treatment datum; and a sheet heating unit configured to heat the sheet contacting the surface property pressing surface of the contact member to at least the softening temperature, wherein the pressing surface forming unit is configured to form the pressing surface such that when the contact member contacts the heated sheet the pressing surface embeds a surface property in the sheet corresponding to the surface property of the pressing surface.

2. The surface treating apparatus according to claim 1, wherein the contact member is an endless belt.

3. The surface treating apparatus according to claim 1, further comprising a sheet cooling unit configured to cool the sheet contacting the contact member.

4. The surface treating apparatus according to claim 1, further comprising:

a sheet reading unit to detect a surface characteristic of the sheet and to generate a corresponding sheet image datum;

an interface to a receive a surface property command; and a controller to generate the surface treatment datum, based on the received surface property command and the sheet image datum.

5. The surface treating apparatus according to claim 4, wherein the surface property datum comprises at least one selected from a type of the surface property, a range to which the surface property is given, and a degree of the surface property.

6. The surface treating apparatus according to claim 5, wherein the type of the surface property comprises at least one selected from a gloss; a mat; a semimat; an emboss; luster; and a combination of two or more of the gloss, the mat, the semimat, the emboss and the luster.

7. The surface treating apparatus according to claim 5, wherein the degree of the surface property is at least one selected from, a scale of an irregularity, an amount of a dent, an amount of a protrusion, and a distribution of the irregularity.

8. The surface treating apparatus according to claim 1, further comprising a curing unit, and wherein the material that is deposited by the contact surface property forming unit comprises at least one selected from an ultraviolet setting ink, a wax ink, a foaming ink, and a phase change ink, and wherein the curing unit cures the deposited material to form the surface property pressing form.

9. The surface treating apparatus according to claim 8, wherein the material is the ultraviolet setting ink.

10. The surface treating apparatus according to claim 8, wherein the contact surface property forming unit includes an ink-jet unit configured to deposit the material the contact member.

11. The surface treating apparatus according to claim 1, wherein the surface property forming unit is configured to deposit the material such that the surface property pressing surface includes a structure that forms an angle not greater than 90 degrees with a general plane of the contact surface area of the contact member.

12. The surface treating apparatus according to claim 1, wherein the thermoplastic resin layer comprises a polyolefine resin.

13. The surface treating apparatus according to claim 1, wherein the sheet comprises an image recording layer on the thermoplastic resin layer.

14. The surface treating apparatus according to claim 2, wherein the sheet heating unit comprises a pair of heat rollers constructed and arranged to be in pressure contact with respective opposing inner and outer surfaces of said endless belt.

15. The surface treating apparatus according to claim 1, wherein a surface of the base of the sheet defines an image recording face, an interface of the thermoplastic resin layer and the image recording face defines a boundary face, and the sheet heating unit is constructed and arranged to heat the image recording face and the boundary face to a temperature substantially equal to or more than said softening point of a thermoplastic resin.

16. The surface treating apparatus according to claim 1, wherein a surface of the base of the sheet defines an image recording face, an interface of the thermoplastic resin layer and the image recording face defines a boundary face, and the sheet cooling unit is constructed and arranged to cool the image recording face and the boundary face to a temperature substantially equal to or more than said softening point of a thermoplastic resin.

17. The surface treating apparatus according to claim 2, further comprising a cleaning unit configured to selectively remove the surface property pressing surface formed on a surface of the endless belt and to selectively clean a surface of the endless belt.

18. An image recording apparatus, comprising:

a sheet having a base, and a thermoplastic resin layer disposed on the base;

an image recording unit configured to record an image on the sheet; and a sheet surface forming unit having a contact member having a surface area configured to contact and convey the sheet;

a pressing surface forming unit configured to form a pressing surface on a contact area of the contact member, by depositing a material onto said contact area in a manner to form the pressing surface with a surface property according to a sheet surface treatment datum; and a sheet heating unit configured to heat the sheet contacting said surface property pressing surface to at least the softening temperature, wherein the pressing surface forming unit is configured to form the pressing surface such that when the contact area contacts the heated sheet the pressing surface embeds a surface property in the sheet corresponding to the surface property of the pressing surface.

19. The image recording apparatus according to claim 18, wherein the sheet surface forming unit further comprises a controlling unit configured to control the surface treatment of the sheet, to selectively determine whether or not a surface of the sheet is treated.

20. An image recording apparatus, comprising:

a surface treating unit configured to carry out a surface treatment of a sheet having a base, and a thermoplastic resin layer disposed on the base; and an image recording unit configured to record an image on the sheet treated by the surface treating unit, wherein the surface treating unit comprises:

a sheet surface forming unit having a contact member having a surface area configured to contact and convey the sheet;

a pressing surface forming unit configured to form a pressing surface on a contact area of the contact member, by depositing a material onto said contact area in a manner to form the pressing surface to have a surface property according to a sheet surface treatment datum; and a sheet heating unit configured to heat the sheet contacting the pressing form of the contact member to at least the softening temperature, wherein the pressing surface forming unit is configured to form the pressing surface such that when the contact area contacts the heated sheet the pressing surface embeds a surface property in the sheet corresponding to the surface property of the pressing surface.

21. The image recording apparatus according to claim 20, wherein the sheet surface forming unit further comprises a controlling unit configured to control the surface treatment of the sheet, to selectively determine whether or not a surface of the sheet is treated.

* * * * *